(12) United States Patent
Sakarcan

(10) Patent No.: US 6,845,767 B2
(45) Date of Patent: Jan. 25, 2005

(54) SEGMENTED DIAMOND BLADE WITH UNDERCUT PROTECTION

(75) Inventor: Metin Sakarcan, Columbia, SC (US)

(73) Assignee: Diamant Boart, Inc., Olathe, KS (US)

( * ) Notice: Subject to any disclaimer, the term of this patent is extended or adjusted under 35 U.S.C. 154(b) by 215 days.

(21) Appl. No.: 10/144,968

(22) Filed: May 14, 2002

(65) Prior Publication Data

US 2003/0213483 A1 Nov. 20, 2003

(51) Int. Cl.[7] .................................................. B28D 1/02
(52) U.S. Cl. ............................. 125/15; 125/18; 125/22; 451/547
(58) Field of Search .............................. 125/15, 18, 22; 451/547

(56) References Cited

U.S. PATENT DOCUMENTS

| | | | |
|---|---|---|---|
| 1,156,166 A | * | 10/1915 | Meyers ........................ 125/15 |
| 2,589,357 A | * | 3/1952 | Fantozzi et al. ............... 125/15 |
| 3,517,463 A | | 6/1970 | Niemic |
| 3,982,521 A | | 9/1976 | Bieri |
| 4,043,311 A | | 8/1977 | Bieri |
| 4,161,167 A | | 7/1979 | Regler et al. |
| 4,291,667 A | | 9/1981 | Eichenlaub et al. |
| 4,337,750 A | * | 7/1982 | Dutcher ........................ 125/15 |
| 4,462,382 A | * | 7/1984 | Baron et al. ................... 125/15 |
| 4,517,954 A | | 5/1985 | deKok et al. |
| 4,677,963 A | * | 7/1987 | Ajamian ....................... 125/15 |
| 4,854,295 A | | 8/1989 | Sakarcan |
| 4,860,722 A | | 8/1989 | Veglio |
| 4,920,946 A | | 5/1990 | Kuromatsu |
| 4,930,486 A | | 6/1990 | Kuromatsu |
| 5,433,187 A | | 7/1995 | Hayasaka et al. |
| 5,471,970 A | | 12/1995 | Sakarcan |
| 5,702,492 A | | 12/1997 | Elsbree |
| 5,787,871 A | | 8/1998 | Jones et al. |
| 5,839,423 A | | 11/1998 | Jones et al. |
| 6,638,153 B2 | * | 10/2003 | Lee et al. ..................... 451/547 |

* cited by examiner

Primary Examiner—Timothy V. Eley
(74) Attorney, Agent, or Firm—Shook, Hardy & Bacon L.L.P.

(57) ABSTRACT

A saw blade of uniform abrasive segments with undercut protection to prevent loss of segments and to extend blade life. A metal core includes a uniform peripheral contour formed as a series of spaced apart, segment mounting sections separated by radial gullet channels. A diamond cutting segment is securely bonded to each such mounting section at a bonding interface between the segment and the metal core. Adjacent the ends of each segment on opposite sides of successive gullet channels, are upstanding ears which at least register with and extend through the radial arc of the bonding interface between the segments and the metal core. Both the upstanding ears and the region beneath each segment are preferably overcoated with a wear protection material such as carbide. The overcoated region beneath each segment includes a contoured edge to assist in directing swarf away from the cutting groove.

21 Claims, 2 Drawing Sheets

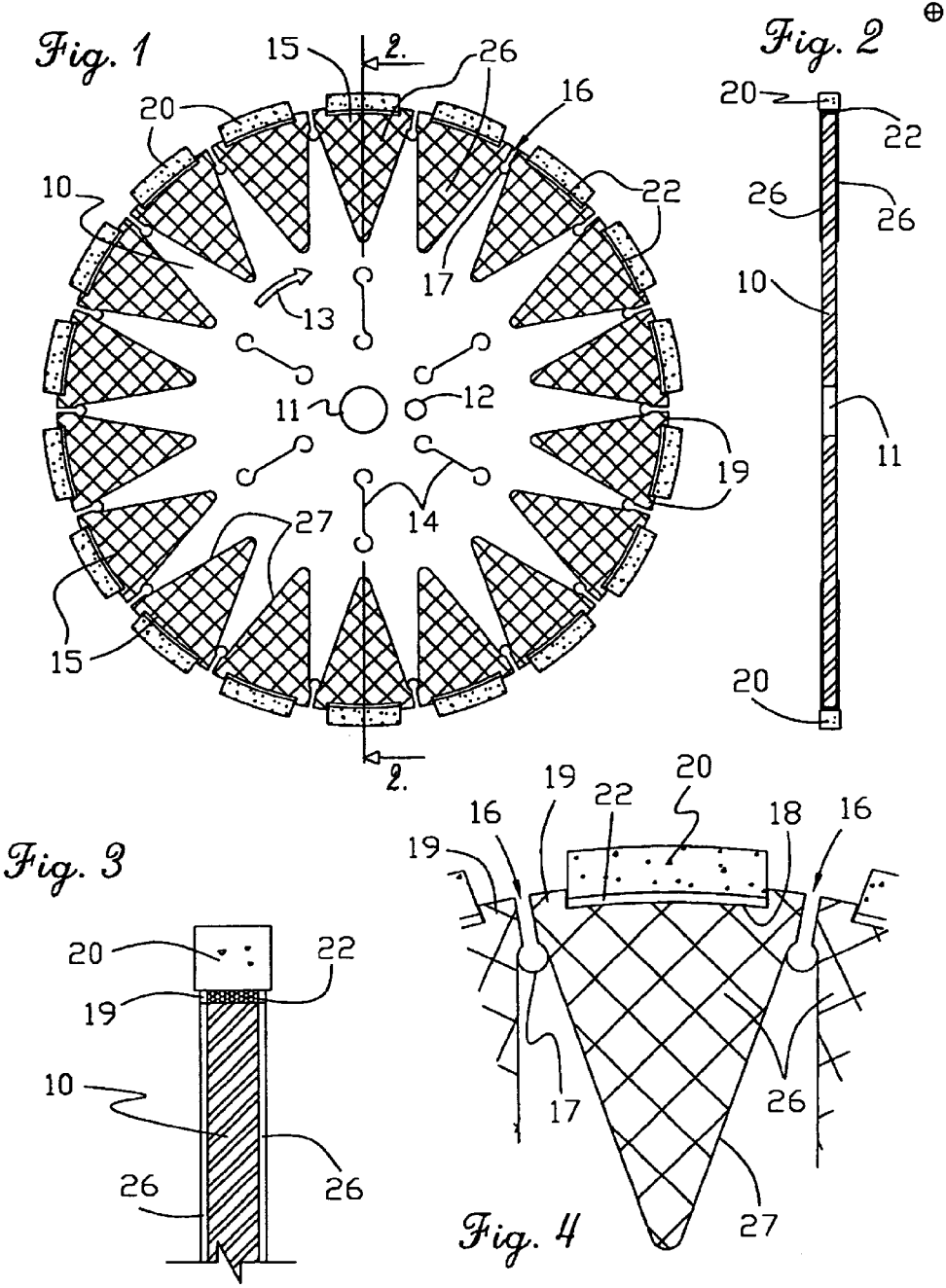

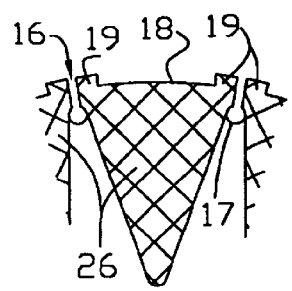
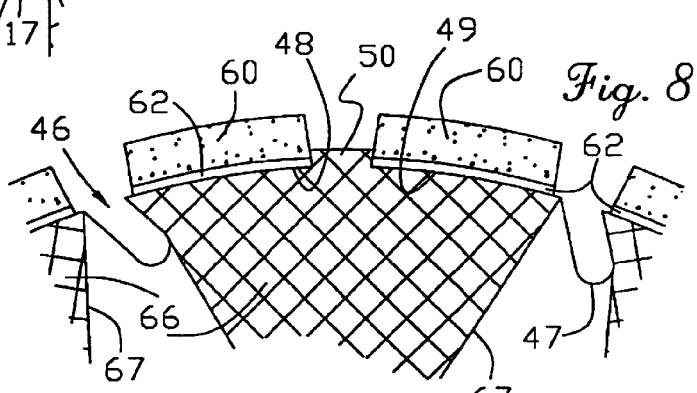
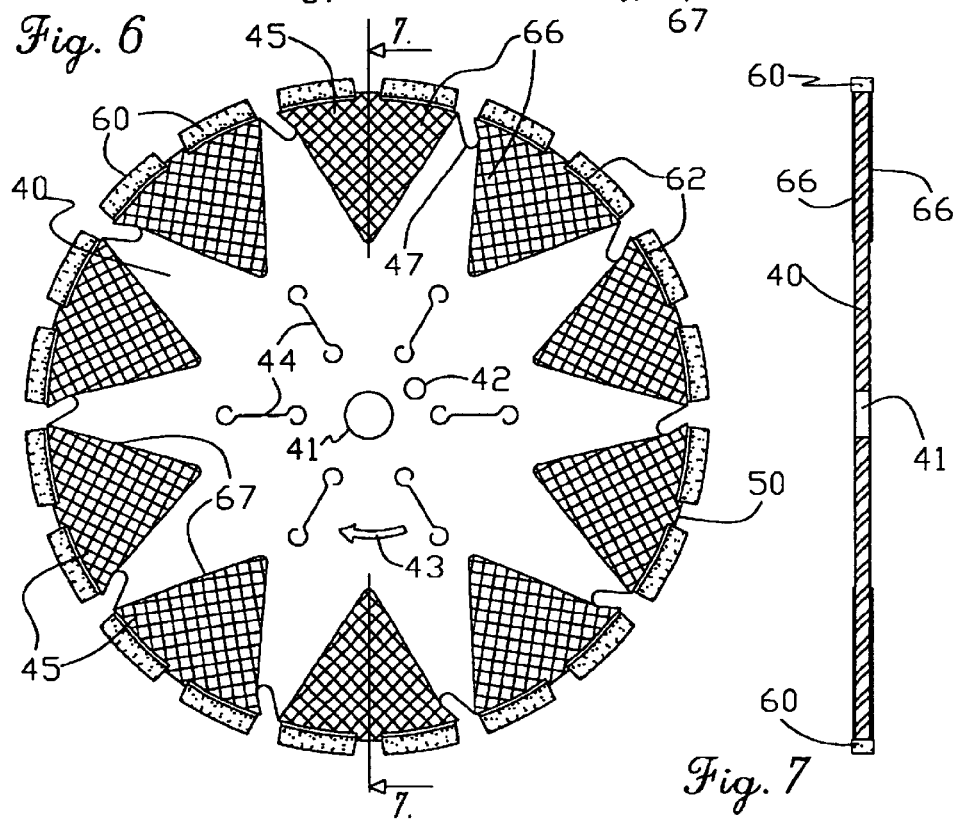

SEGMENTED DIAMOND BLADE WITH UNDERCUT PROTECTION

BACKGROUND OF THE INVENTION

This invention relates to abrasive saw blades or cutting wheels for cutting concrete, asphalt and masonry materials. More specifically, the invention relates to an abrasive blade with a plurality of diamond impregnated segments affixed to a circular metal core for cutting stone-type materials.

Industrial saw blades referred to as the discontinuous rim or segmented type blade are well known and currently in widespread use. This type of blade is conventionally made by mounting to a circular core a series of short arcuate abrasive cutting segments containing diamond powder disbursed in a metal matrix. These cutting segments are usually about two inches long and are ordinarily silver soldered, brazed or welded to the rim of a steel core which has been divided into a plurality of support sections having peripheral surfaces for supporting the cutting segments.

The support sections are separated by radially extending gullets which accommodate the large thermal stresses created by the frictional heating of the blade periphery during cutting operations as well as the large thermal stresses created during the mounting of the cutting segments on the blade core during manufacture. Segmented blades have been accepted by those industries that subject the blades to heavy-duty use, such as the concrete, asphalt and masonry cutting industries where rough abrasive cutting is commonplace.

Although segmented blades may be designed for dry cutting, it is more common to continuously flush the cutting area during the cutting operation with a fluid coolant such as water in order to keep the blade as cool as possible. The coolant also serves as a lubricant to flush loose rock-like material, spent abrasive and the like from the cutting site, all of which in combination with the coolant forms an abrasive slurry which is generally referred to in the industry as "swarf".

Even though construction of segmented blades has been developed to a high degree of reliability, blades must commonly be replaced whenever the swarf erodes the steel drive core adjacent the junction of the cutting segments with the core. This erosion occurs radially inwardly of the cutting segments around the weldment between the segments and the core and is commonly referred to as "undercutting".

The phenomenon of undercutting is particularly bothersome because it significantly reduces blade life. Even though up to half of the original material of each abrasive cutting segment may remain, the entire blade must be replaced for reasons of safety when severe undercutting is noted. Otherwise, the likelihood increases that one or more segments will break loose during cutting operations when the blade is rotating at a high rate of speed and a potentially dangerous condition results.

In addition to the safety hazard, undercutting has an economic impact as well. Since the abrasive segments are the most costly portion of the blade, significant economic loss is incurred by undercutting due to nonuse or waste of the remaining cutting segment material. In addition, frequent replacement of undercut blades further reduces productivity by increasing the downtime workers spend in replacing the blades instead of operating the saw.

Undercutting of saw blades is particularly acute when "green" concrete is being cut. Green concrete is concrete in its relatively freshly poured state prior to fully curing. Curing can take from 4 to 60 hours to complete. During this time, the green concrete begins to shrink. If this shrinkage is not controlled, cracks will form throughout the concrete. Accordingly, it is common to cut grooves in green concrete for stress relief and crack control. Such grooves are commonly referred to as contraction joints. Because green concrete is not fully hardened and cured, it is particularly susceptible to forming highly abrasive swarf, which aggressively acts to undercut segments of the saw blade.

In the past, numerous solutions have been directed to the problems of undercutting and segment lose. U.S. Pat. No. 4,291,667 of Eichenlaub et al.; U.S. Pat. No. 4,854,295 of Sakarcan; U.S. Pat. No. 5,787,871 of Jones et al.; and U.S. Pat. No. 5,839,423 of Jones et al. each acknowledge such problems and are representative of some of the previously proposed remedies. Generally speaking, past attempts have focused effort on better ways to mount the segments onto the core or to remove or flush the abrasive swarf from the cutting site. Such efforts have achieved only limited success.

Some of the prior attempts to reduce undercutting have included asymmetrical cutting elements or dimensional variances of the gullets between successive segments in an effort to protect the symmetrical or uniform cutting elements or to create a turbulent flow pattern, as opposed to a laminar flow pattern, of the swarf around the blade. Such changes in abrasive blade design have many times resulted in increased blade vibration and wear.

Accordingly, a need exists in the industrial cutting industry for a segmented abrasive blade having improved wear characteristics to prevent premature wear adjacent the bond line formed between the blade core and the cutting segments. The primary object to this invention is to meet this need.

SUMMARY OF THE INVENTION

The present invention has been developed to meet the needs noted above and therefore has as a primary objective the provision of a segmented type abrasive cutting blade which is highly resistant to core undercutting and which allows full use of the costly abrasive cutting segments.

Another object of the invention is to provide an abrasive blade of the character previously described which is safe and reliable in operation and use.

An additional object of the invention is to provide an abrasive blade of the character previously described to protectively shield the weldment line joining the segment to the blade core from direct impact by swarf in the cutting site.

Another object of the invention is to provide an abrasive blade of the character previously described have wear resistance regions to assist in the protection of the weldment joining the segment to the blade core and to also direct swarf away from the cutting site.

Yet another object of the invention is to provide an abrasive blade of the character previously described that minimizes blade and cutting segment vibration to assist in safe operations and prolonged blade life.

A further object of the invention is to provide an abrasive blade of the character previously described which is radially symmetrical as a result of manufacture from uniformly similar segments securely bonded to a balanced and radially consistent blade core.

In summary, therefore, an object of the invention is to provide a saw blade of uniform abrasive segments with undercut protection to prevent loss of segments and to extend blade life. A metal core includes a uniform peripheral contour formed as a series of spaced apart, segment mounting sections separated by radial gullet channels. A diamond cutting segment is securely bonded to each such mounting section at a bonding interface between the segment and the metal core. Adjacent the ends of each segment on opposite sides of successive gullet channels, are upstanding ears which at least register with and extend through the radial arc of the bonding interface between the segments and the metal core. Both the upstanding ears and the region beneath each segment are preferably overcoated with a wear protection material such as carbide. The overcoated region beneath each segment includes a contoured edge to assist in directing swarf away from the cutting groove.

Other and further objects of the invention, together with the features of novelty appurtenant thereto, will appear in the course of the following description.

BRIEF DESCRIPTION OF THE DRAWINGS

In the accompanying drawings, which form a part of the specification and are to be read in conjunction therewith and in which like reference numerals are used to indicate like parts in the various views:

FIG. 1 is a side elevational view of a segmented diamond blade constructed in accordance with a first preferred embodiment of the invention;

FIG. 2 is a sectional edge view of the blade taken along line 2—2 of FIG. 1 in the direction of the arrows;

FIG. 3 is an enlarged, fragmentary view of the upper end of FIG. 2 to better illustrate the details of construction of a cutting segment joined to the blade core;

FIG. 4 is a an enlarged, fragmentary view of a portion of the blade core with a diamond segment bonded thereto;

FIG. 5 is a fragmentary view of a portion of the blade core shown before a diamond segment is bonded thereto;

FIG. 6 is a side elevational view of a segmented diamond blade constructed in accordance with a second preferred embodiment of the invention;

FIG. 7 is a sectional edge view of the blade taken along line 7—7 of FIG. 6 in the direction of the arrows; and FIG. 8 is an enlarged, fragmentary view to better illustrate the details of construction of a cutting segment joined to the blade core shown in FIG. 6.

DETAILED DESCRIPTION OF THE DRAWINGS

Referring first to FIGS. 1–5 of the drawings in greater detail, the abrasive blade of this invention characteristically includes a generally circular, flat metal core 10 of uniform thickness. The core 10 has a central, axial bore 11 therethrough to receive a drive shaft or work arbor spindle of a saw (not shown) to rotatably drive the core 10 in the direction indicated by the directional arrow 13. The core 10 further includes a drive pin bore 12 offset from the axial bore 10 to receive a drive pin associated with the drive shaft or work arbor spindle of a saw to aid in the rotational drive of the core 10.

The core 10 may also be provided with a series of stress relief cuts 14 therethrough in a uniform radial pattern. In addition to relief of internal stress risers in the core 10, the relief cuts 14 assist in the control of warpage and dissipation of heat during sawing operations.

The outermost edge or perimeter of the core 10, as best shown in FIGS. 1, 4 & 5, is an interrupted circular contour formed by a series of spaced apart mounting sections or tongues 15. The tongues 15 are separated by radial gullets or channels 16 extending in a direction toward the axial bore 11 of the core 10. The bottom of each such channel 16 terminates in a circular or otherwise arcuate contour 17 in order to relieve any stresses in the metal.

As perhaps most easily understood with reference to FIG. 5 which illustrates a representative tongue section 15 before attachment of a diamond segment, the configuration of each mounting section or tongue 15 includes a peripheral mounting edge 18 recessed between a pair of upstanding ears 19. Accordingly, adjacent ears 19 of successive tongues 15 define the mouth or initial opening of the gullet 16 between the adjacent tongues 15.

Referring next to FIG. 4, securely attached to the peripheral mounting edge 18 of each tongue 15, as by soldering, brazing, or welding (i.e., resistance, electron beam or laser), is a cutting segment 20. The attachment process results in a weldment or bonding interface 22 between the mounting edge 18 and the segment 20. Each segment 20 may be fabricated in accordance with techniques readily understood by those skilled in the art from an abrasive material such as diamond particles dispersed within a metal matrix. Such segments are commonly called diamond segments as a shorthand reference. Nevertheless, for the purposes of this invention, the abrasive material from which the segments are made may be any of the conventional abrasives which are well known in a wide variety of industrial cutting applications.

Typically, both the diamond segment 20 and the associated mounting edge 18 to which it is bonded are arcuate in shape and this configuration is consistently illustrated in the accompanying drawings. However, it is also know in the art to have flat, rather than arcuate, matting surfaces between the diamond segment and its associated mounting edge. Such configurations are also contemplated for use with this invention. Regardless of the configuration of the bonding interface 22 between the mounting edge 18 and its associated segment 20, whether it be straight or arcuate, when the core 10 is rotatable powered during cutting operations, the bonding interface 22 travels in an arcuate orbit around the drive axle of the saw. It is of critical importance in the practice of this invention that the upstanding ears 19 project radially outward a sufficient distance to at least register with, and preferably extend through, the outermost radial arc of the bonding interface 22 between the segments 20 and the metal core 10.

On each side of the core 10, beginning on the tongues 15 and tapering inwardly towards the axial bore 11 are a plurality of hardfaced coating skins or regions 26 affixed to the surface of the metal core 10. Each coating skin 26 is a thin layer of wear resistance material such as carbide. These regions are consistently depicted in the drawings with a net-type hatch pattern to distinguish these thin regions from the adjacent metal of the core 10 and bonding interfaces 22. Those skilled in the art will readily understand the various types of wear resistance materials used on metals and the processing techniques necessary to bond a wear resistance coating to its associated metal substrate. For the purposes of this invention, portions of the shape, configurations and contours of the coating skins 26 are of critical importance, but the wear resistance material from which the coating skins are made may be any of the conventional materials which are well known in a wide variety of industrial cutting applications.

In terms of the shape and configuration of the coating skins 26, it is important that the metal of the core beneath the segment 20 be coated. It is also important that each coating skin 26 has a contoured leading edge 27 directed generally inward toward the axial bore 11 to assist in directing swarf out of the cutting groove and away from the arcuate orbit traveled by the bonding interfaces 22. The leading edge 27 may be a linearly angled edge as illustrated in the drawings or may be of a nonuniform, arcuate shape. As illustrated in the drawings, the coating skins 26 are preferably triangular in shape to incorporate the foregoing objectives and may be terminated as a rounded apex well short of the axial bore 11 itself. What appears to be important is that the skin 26 coat the core beneath the segment 20 and the leading edge 27 of each skin 26 taper inwardly from the gullets 16 to aid in the removal of cutting slurry from the cutting groove of the material being sawed.

In accordance with the desirability of coating those parts of the metal core 10 in close proximity to the segment 20, and most particularly the bonding interface 22, the upstanding ears 19 are preferably coated with wear resistance carbide and may actually form an extended portion of the triangular skin 26 beneath the segment 20. Likewise, it is desirable, although certainly optional, that the bonding interface 22 also be coated with wear resistance carbide for added protection. Obviously, the segment 20 must be first attached to the metal core 10 if the bonding interface 22 is to be coated with wear resistance material. The more conventional manufacturing technique, however, is to first affix the coating skins 26 to the metal core 10 and then attach the cutting segments 20 which results in the upstanding ears 19 receiving application of the carbide layer but the bonding interface remains uncoated.

The importance of the height of the upstanding ears 19 relative to the bonding interfaces 22 has previously been mentioned. Also of critical importance are the relative, rather than specific, thicknesses of the metal core 10, segment 20 and coating skin 26. Reference is made to FIG. 4 of the drawings. The metal core 10 may be of any conventional thickness of a variety commonly used in the industrial cutting applications. The coating skin 26 must be of sufficient thickness on each side of the core 10 to adequately protect the common or treated steel from which the saw blade is fabricated, particularly in the region underlying the segment 20. As is normal and well known in this art, the segment 20 is characteristically thicker than the core so as to project an equal distance on each side of the core 10. But it is important in this invention that the segment have a sufficient thickness to project an equal distance on each side of both the core 10 and the layers (one on each side of the core 10) of the coating skins 26. Therefore, the thickness of the segment 20 must be at least equal to, and preferably greater than, the thickness of the core 10 plus twice the thickness of a coating skin 26. Alternatively stated as a limitation on the thickness of the coating skin 26, it must be equal to or less than half the thickness of the segment 20 minus half the thickness of the core 10.

The abrasive blade illustrated in FIGS. 1–5 includes eighteen evenly spaced tongue 15 and segment 20 pair combinations. The specific number of such combinations is unimportant and an alternative number can be selected. FIGS. 6–8 illustrate an abrasive blade having ten evenly spaced tongues and with 20 paired cutting segments as a second preferred embodiment of the invention. The following description will assist in an understanding of the similarities and differences necessary when modifying the number of the tongue and segment combinations of the blade.

The abrasive blade of the second embodiment includes a generally circular, flat metal core 40 of uniform thickness. The core 40 has a central, axial bore 41 therethrough to receive a drive shaft or work arbor spindle of a saw (not shown) to rotatably drive the core 40 in the direction indicated by the directional arrow 43. The core 40 further includes a drive pin bore 42 offset from the axial bore 40 to receive a drive pin associated with the drive shaft or work arbor spindle of a saw to aid in the rotational drive of the core 40.

The core 40 may also be provided with a series of stress relief cuts 44 therethrough in a uniform radial pattern. In addition to relief of internal stress risers in the core 40, the relief cuts 44 assist in the control of warpage and dissipation of heat during sawing operations.

The outermost edge or perimeter of the core 40, as best shown in FIGS. 6 & 8, is an interrupted circular contour formed by a series of spaced apart mounting sections or tongues 45. The tongues 45 are separated by radial gullets or channels 46 cut into the core 40 at an acute angle relative to a radial line from the axial bore 41 of the core 40. The bottom of each such channel 16 terminates in an arcuate contour 47 in order to relieve any stresses in the metal.

As perhaps most easily understood with reference to the enlarged fragmentary view of FIG. 8, the configuration of each mounting section or tongue 45 includes a pair of peripheral mounting edges 48 & 49 of substantially equal dimensions which are separated by an upstanding ear 50.

Securely attached to each of the peripheral mounting edges 48 & 49 of each tongue 45, as by soldering, brazing, or welding (i.e., resistance, electron beam or laser), is a cutting segment 60. The attachment process results in a weldment or bonding interface 62 between the mounting edges 48 & 49 and their associated segments 60. Each segment 60 may be fabricated in accordance with techniques readily understood by those skilled in the art from an abrasive material such as diamond particles dispersed within a metal matrix. Nevertheless, for the purposes of this invention, the abrasive material from which the segments are made may be any of the conventional abrasives which are well known in a wide variety of industrial cutting applications.

Typically, both the diamond segments 60 and the associated mounting edges 48 & 49 to which they are bonded are arcuate in shape and this configuration is consistently illustrated in the accompanying drawings. However, it is also know in the art to have flat, rather than arcuate, matting surfaces between the diamond segment and its associated mounting edge. Such configurations are also contemplated for use with this invention. Regardless of the configuration of the bonding interface 62 between the mounting edges 48 & 49 and their associated segments 60, whether it be straight or arcuate, when the core 40 is rotatable powered during cutting operations, the bonding interface 62 travels in an arcuate orbit around the drive axle of the saw. It is of critical importance in the practice of this invention that the upstanding ear 50 between successive segments 60 on a mounting tongue 45 projects radially outward a sufficient distance to at least register with, and preferably extend through, the outermost radial arc of the bonding interface 62 between the segments 60 and the metal core 40.

In comparing the diamond blade construction show in FIGS. 1–5 with the second embodiment shown in FIGS. 6–8, it will be understood that the second embodiment has a single ear 50 protecting two adjacent segments 62 while an upstanding ear 19 is adjacent each end of each segment 20 in the first embodiment. Although it is thought that the first embodiment offers greater protection to the segment and particularly the bonding interface, even a single ear 50 contacting adjacent segments 62 offers significant protection from segment loss over techniques previously taught by the prior art.

On each side of the core 40, beginning on the tongues 45 and tapering inwardly towards the axial bore 41 are a plurality of hardfaced coating skins or regions 66 affixed to the surface of the metal core 40. Each coating skin 66 is a thin layer of wear resistance material such as carbide. These regions are consistently depicted in the drawings with a net-type hatch pattern to distinguish these thin regions from the adjacent metal of the core 40 and bonding interfaces 62. Those skilled in the art will readily understand the various types of wear resistance materials used on metals and the processing techniques necessary to bond a wear resistance coating to its associated metal substrate. For the purposes of this invention, portions of the shape, configurations and contours of the coating skins 66 are of critical importance, but the wear resistance material from which the coating skins are made may be any of the conventional materials which are well known in a wide variety of industrial cutting applications.

In terms of the shape and configuration of the coating skins 66, it is important that the metal of the core beneath the paired segments 60 be coated. It is also important that each coating skin 66 has a contoured leading edge 67 directed generally inward toward the axial bore 41 to assist in directing swarf out of the cutting groove and away from the arcuate orbit traveled by the bonding interfaces 62. The leading edge 67 may be a linearly angled edge as illustrated in the drawings or may be of a nonuniform, arcuate shape. As illustrated in the drawings, the coating skins 66 are preferably triangular in shape to incorporate the foregoing objectives and may be terminated as a rounded apex well short of the axial bore 41 itself. What appears to be important is that the skin 66 coat the core beneath the segment 60 and the leading edge 67 of each skin 66 taper inwardly from the gullet 16 to aid in the removal of cutting slurry from the cutting groove of the material being sawed.

In accordance with the desirability of coating those parts of the metal core 40 in close proximity to the paired segments 60, and most particularly the bonding interfaces 62 thereof, the upstanding ear 19 between the paired segments 60 is preferably coated with wear resistance carbide and may actually form an extended portion of the triangular skin 66 beneath the segments 60. Likewise, it is desirable, although certainly optional, that the bonding interface 62 also be coated with wear resistance carbide for added protection. Obviously, the segments 60 must be first attached to the metal core 40 if the bonding interface 62 is to be coated with wear resistance material. The more conventional manufacturing technique, however, is to first affix the coating skins 66 to the metal core 40 and then attach the cutting segments 60 which results in the upstanding ear 50 receiving application of the carbide layer but the bonding interface 62 remains uncoated.

The importance of the height of the upstanding ears 50 relative to the bonding interfaces 62 has previously been mentioned. Also of critical importance are the relative, rather than specific, thicknesses of the metal core 40, segment 60 and coating skin 66. Reference is made to FIG. 7 of the drawings. The metal core 40 may be of any conventional thickness of a variety commonly used in the industrial cutting applications. The coating skin 66 must be of sufficient thickness on each side of the core 10 to adequately protect the common or treated steel from which the saw blade is fabricated, particularly in the region underlying the segment 60. As is normal and well known in this art, the segment 60 is characteristically thicker than the core so as to project an equal distance on each side of the core 40. But it is important in this invention that the segment 60 have a sufficient thickness to project an equal distance on each side of both the core 40 and the layers (one on each side of the core 40) of the coating skins 66. Therefore, the thickness of the segment 60 must be at least equal to, and preferably greater than, the thickness of the core 40 plus twice the thickness of a coating skin 66. Alternatively stated as a limitation on the thickness of the coating skin 66, it must be equal to or less than half the thickness of the segment 60 minus half the thickness of the core 40.

Operation of the abrasive blade can be understood with reference to the embodiment illustrated in FIGS. 1–5. A blade constructed in accordance with the foregoing principles is mounted by placing the axial bore 11 on the drive shaft or work arbor spindle of a saw so that the blade will be driven in the direction of the rotational arrow 13. If the saw is equipped with a drive pin, then it will be received in the drive pin bore 12 to assist in powering the rotation of the blade.

During cutting application, as in concrete for example, the removal of material is primarily achieved by the outer circumferential surface of the segments 20 engaging the bottom of the groove being cut. Each segment 20 rotates through the groove of the cut to remove material in an abrasive, grinding fashion. Over prolonged cutting, the segment 20 gradually wears away. This exposes fresh diamond bits held within the matrix of the segment 20 to renew the circumferential cutting surface of the segment.

Testing has confirmed superior results for an abrasive blade constructed in accordance with the principles of this invention. The feature of upstanding ears assist in protecting the bonding interfaces. Likewise, the triangular shaped coating skins assist in protecting the bonding interfaces, as well as directing the swarf away from contact with the bonding interfaces to thereby increase blade life and minimize premature segment loss.

From the foregoing it will be seen that this invention is one well adapted to attain all end and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An abrasive saw blade comprising:
   a metal core having a central axial bore for rotation in a given, singular rotational direction and having a plurality of uniform, spaced apart peripheral mounting sections separated by uniform radial notches;
   a plurality of abrasive segments of substantially uniform shape and size, and each having first and second ends, said segments being securely attached to said mounting sections of said metal core to form a bonding interface therewith of substantially uniform thickness with said first and second ends of said segments being at a preselected radius from said central axial bore;
   a plurality of projections integral with said metal core which extend outwardly from said peripheral mounting sections to at least register with and extend through said preselected radius of said bonding interface at the ends of said segments;

whereby said projections provide undercut protection to said bonding interface between said segments and the mounting sections of said metal core to extend blade life and minimize premature segment loss; and a plurality of regions spaced apart from one another proximate said segments on each side of said metal core coated with a layer of wear resistance material, said layer being discontinuous.

2. The abrasive blade as in claim 1, wherein at least one end of each said abrasive segment is adjacent one of said plurality of projections.

3. The abrasive blade as in claim 2, wherein each end of each said abrasive segment is adjacent one of said plurality of projections.

4. The abrasive blade as in claim 1, wherein said abrasive segments comprise diamonds dispersed in a metal matrix.

5. The abrasive blade as in claim 1, wherein said abrasive segments have an attachment surface having a uniform radius of curvature and said mounting sections include a peripheral attachment edge having a uniform radius of curvature matching that of said segments.

6. The abrasive blade as in claim 1, wherein each of said radial notches includes substantially parallel sidewalls which terminates interiorly of said metal core in an arcuate wall portion.

7. The abrasive blade as in claim 1, wherein each said segment is securely bonded to one of said mounting sections by soldering, brazing, resistance welding, electron beam welding, or laser welding.

8. The abrasive blade as in claim 1 wherein said layer of wear resistance material has a generally triangular shape.

9. The abrasive blade as in claim 8 wherein the layer of wear resistance material extends between successive radial notches in said metal core.

10. The abrasive blade as in claim 1 wherein said metal core has a first thickness, said thin layer of wear resistance material has a second thickness, and said segments have a thickness greater than or equal to said first thickness plus twice said second thickness.

11. The abrasive blade as in claim 1 wherein said projections are also coated with a layer of wear resistance material.

12. An abrasive saw blade comprising:

a metal core having a central axial bore for rotation in a given, singular rotational direction and having a plurality of uniform, spaced apart peripheral mounting sections separated by uniform radial notches;

a plurality of abrasive segments of substantially uniform shape and size, and each having first and second ends, said segments being securely attached to said mounting sections of said metal core to form a bonding interface therewith of substantially uniform thickness with said first and second ends of said segments being at a preselected radius from said central axial bore; and a plurality of regions proximate said segments on each side of said metal core coated with a thin layer of wear resistance material, said layer being discontinuous;

whereby said regions provide undercut protection to said bonding interface between said segments and the mounting sections of said metal core to extend blade life and minimize premature segment loss.

13. The a abrasive blade as in claim 12 wherein said metal core has a first thickness, said thin layer of wear resistance material has a second thickness, and said segments have a thickness greater than or equal to said first thickness plus twice said second thickness.

14. The abrasive blade as in claim 12 wherein each region coated with a thin layer of wear resistance material extends between successive radial notches in said metal core.

15. The abrasive blade as in claim 12 further including a plurality of projections integral with said metal core which extend outwardly from said peripheral mounting sections to at least register with and extend through said preselected radius of said bonding interface at the ends of said segments, whereby said projections aid said regions to provide undercut protection to said bonding interface between said segments and the mounting sections of said metal core to extend blade life and minimize premature segment loss.

16. The abrasive blade as in claim 15, wherein at least one end of each said abrasive segment is adjacent one of said plurality of projections.

17. The abrasive blade as in claim 16, wherein each end of each said abrasive segment is adjacent one of said plurality of projections.

18. The abrasive blade as in claim 15, wherein said abrasive segments comprise diamonds dispersed in a metal matrix.

19. The abrasive blade as in claim 15, wherein said abrasive segments have an attachment surface having a uniform radius of curvature and said mounting sections include a peripheral attachment edge having a uniform radius of curvature matching that of said segments.

20. The abrasive blade as in claim 15, wherein each of said radial notches includes substantially parallel sidewalls which terminates interiorly of said metal core in an arcuate wall portion.

21. The abrasive blade as in claim 15, wherein each said segment is securely bonded to one of said mounting sections by soldering, brazing, resistance welding, electron beam welding, or laser welding.

* * * * *